Oct. 16, 1923.
H. D'OLIER, JR
1,470,870
ILLUMINATING FIXTURE GAUGE
Filed Dec. 12, 1921
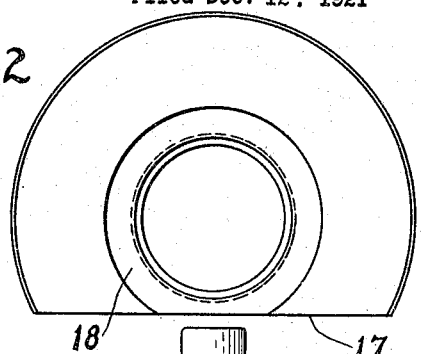
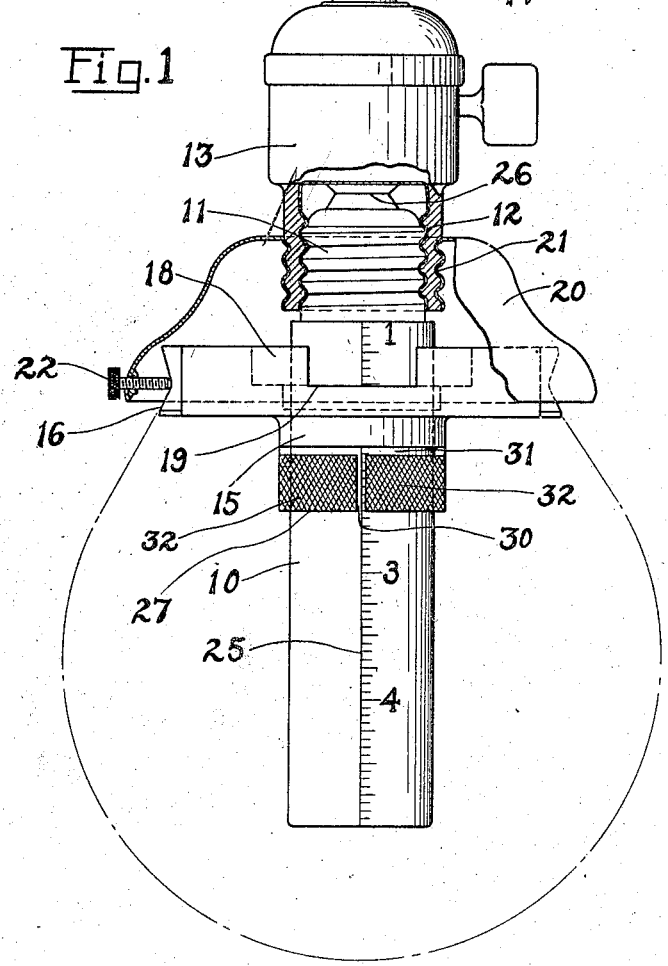
Inventor
Henry D'Olier Jr
By Joseph K. Schofield
Attorney Patented Oct. 16, 1923.

1,470,870

UNITED STATES PATENT OFFICE.

HENRY D'OLIER, JR., OF BRIDGEPORT, CONNECTICUT.

ILLUMINATING FIXTURE GAUGE.

Application filed December 12, 1921. Serial No. 521,824.

*To all whom it may concern:*

Be it known that I, HENRY D'OLIER, Jr., a citizen of the United States, residing at Bridgeport, in the county of Fairfield and State of Connecticut, have invented certain new and useful Improvements in Illuminating Fixture Gauges, of which the following is a specification.

This invention relates to gauges, and particularly to a gauge for lamp fixtures, whereby the elements of a fixture may be assembled and the combined fixture accurately gaged or measured from a fixed point on the socket.

The object of the present invention is to provide a gauge adapted to fit a lamp socket with a slidable member, a portion of which conforms to the heel portion of an illuminating fixture, such as a globe. With the canopy or holder for the globe mounted on the socket in operative position, the point of engagement of the canopy with a globe or other illuminating device may be tested for accuracy of position relative to the lamp socket. One feature which enables me to accomplish the above objects is the provision of a graduated rod, on which a sliding member adapted to engage the canopy may operate, one end of the rod being screw threaded to conform to the screw threads formed within a lamp socket.

Another feature that is advantageous is the provision of a sliding member, the outer periphery of which is made to conform to the heel portions of a globe. Sliding members may be provided for each type and size of globe to be used. With a socket and canopy or holder assembled together, the alignment of the canopy and its limits of adjustment may be tested by moving the sliding member into operative position and noting the position of the sliding member on a graduated scale provided on the rod.

Another object of the invention is to provide a scale along the bar so graduated that the position of the sliding member indicating the position of the securing members on the canopy or holder relative to a point on the socket may be readily determined. Preferably the scale is so arranged that the distance measured is between the socket contact against which the end of the bar is in contact and the plane of the canopy holding members which is in the plane of the reduced portion at the heel of the globe.

With these and other objects in view, my invention consists in the features of construction and operation set forth in the following specification and illustrated in the accompanying drawing.

In the accompanying drawing annexed hereto and forming a part of this specification, I have shown my invention embodied in a particular form of socket and fixture gauge but it will be understood that the invention can be otherwise embodied and that the drawing is not to be construed as defining or limiting the scope of the invention, the claims appended to this specification being relied upon for that purpose.

In the drawing:

Figure 1 shows a longitudinal view of the complete device with a socket and canopy in gauging position thereon.

Figure 2 is a plan view of the sliding member.

In the above mentioned drawing, I have shown but one modification of the invention which is now deemed preferable but it is to be understood that changes and modifications may be made within the scope of the appended claims without departing from the spirit of the invention.

Briefly, my invention, in its broadest aspect, comprises the following principal parts: first, a bar on which screw threads are provided near one end adapted to conform to the internal screw threads on a standard lamp socket; second, a sliding member adapted to move over the rod having its outer periphery made to conform to the heel portion of a globe or other illuminating device; and third, a scale extending along the bar whereby the position of the sliding member relative to the threaded end of the bar may be readily determined.

Referring more in detail to the figures of the drawing, at 10 is shown a bar having screw threads 11 at one end adapted to conform to the dimensions of a standard screw thread such as at 12 formed in a lamp socket 13. As the axis of the screw threads 11 is in alignment with the axis of the bar 10, rotation of the bar with the socket 13 thereon will indicate any eccentricity of the screw threads 12 relative to the axis of the socket. The accuracy of the screw threads 12 as to lead and dimensions may also be observed.

At 15 is shown a member slidable along the bar 10 having its outer periphery 16 formed to correspond with the heel of an illuminating globe or other illuminating device which may be used in conjunction with the socket 13 and its canopy or globe holder 20. A conventional form of globe is shown in dotted outline. It will be understood that the surface 16 as shown is purely conventional and will be varied in diameter and contour to conform to the different illuminating devices adapted to be used in connection with a lamp inserted within the socket 13. Preferably, as shown in Fig. 2, I cut away a portion of this lighting member 15 as shown at 17. Also, as shown at 18, I counterbore the upper surface of the member 15 approximately one-half of its height so that the bottom surface 19 of this counterbored portion 18 of the member 15 will be in alignment with the smallest portion of the surface 16 which portion is adapted to be engaged by fastening means such as 22 on canopy 20.

At 20 I show a conventional form of canopy adapted to be associated with the socket 13, this being threaded in the usual manner, as shown at 21, to the outer surface of the socket 13. About the lower edge of the canopy 20 is mounted a plurality of conventional securing means 22, one of which is shown in Fig. 1. With the canopy 20 and its fastening means 22 mounted on the socket 13, the member 15 may be moved into position shown in Fig. 1, and, by examining the relation of the sliding member 15 with the parts of the canopy 20 and securing means 22, the concentricity of this canopy may be determined.

Extending along the bar 10 is a scale 25 having graduations extending throughout the major portion of the bar. Preferably, the zero of this scale is at the upper end 26 of the bar 10, which end as stated above is adapted to contact with a part of the socket. By observing the position of the surface 19 of the sliding member 15 relative to the scale 25, the position of the fastening means 22 on canopy 20 and therefore the heel portion of a globe adapted to contact therewith will be readily determined. This will also indicate the position of the heel of the globe relative to a fixed point on the socket.

For convenience in reading the position of this surface on the scale 25, I make the distance between the surface 19 and the lower surface 27 of the sliding member 15 a predetermined dimension such as one inch so that, by knowing this distance and the position of the lower surface 27 on the scale 25, the position of the securing members 22 below the point of contact 26 with the socket 13 may be readily determined.

I also preferably split a portion of the member 15, as shown at 30 and 31, to form extensions 32 and use these portions, which have inherent resiliency, to provide contact of the sliding member 15 with the bar 10 sufficient to hold the member 15 in any adjusted position.

What I claim is:

1. A lamp fixture gauge comprising in combination, a bar adapted at one end to be fitted to a lamp socket, there being a scale extending along one side of said bar, and a member slidable along said bar and having a part conforming in shape to the heel portion of an illuminating fixture whereby the adjustment of a fixture relative to a lamp socket may readily be determined.

2. A lamp fixture gauge comprising in combination, a bar adapted at one end to be fitted to a lamp socket in a predetermined position relative thereto, there being a scale extending along one side of said bar, and a member slidable along said bar and having a part conforming in shape to the heel portion of an illuminating fixture whereby the distance of the heel portion of the fixture below the lamp socket may readily be determined.

3. A lamp fixture gauge comprising in combination, a bar adapted at one end to be threaded to a lamp socket, there being a scale extending along one side of said bar, a member slidable along said bar and having a part conforming in shape to the heel portion of an illuminating fixture whereby the relative positions of the fixture and the socket may readily be determined.

4. A lamp fixture gauge comprising in combination, a bar adapted at one end to be fitted to a lamp socket in alignment with its axis, there being a scale extending along one side of said bar, a member slidable along said bar and having a part conforming in shape to the heel portion of an illuminating fixture whereby the position of a fixture holder on said socket relative to a fixed point of said socket may readily be determined.

5. A lamp fixture gauge comprising in combination, a bar adapted at one end to be fitted to a lamp socket, there being a scale extending along one side of said bar, and a member slidable along said bar adapted to contact with globe attaching means on a canopy mounted on a part of said lamp socket, whereby the gauge may be used to test the alignment and adjustment of the canopy relative to the lamp socket.

6. A lamp fixture gauge comprising in combination, a bar adapted at one end to be threaded into engagement with a lamp socket, there being a scale extending along one side of said bar, and a member slidable along said bar having a part conforming in shape to the heel portion of an illuminating fixture and adapted to contact with globe attaching means on a canopy forming a part of said lamp fixture, whereby the gauge may be used to test the alignment and adjustment of the canopy relative to the socket.

In testimony whereof I hereto affix my signature.

HENRY D'OLIER, Jr.